(12) United States Patent
Schwendenmann et al.

(10) Patent No.: US 11,454,324 B2
(45) Date of Patent: Sep. 27, 2022

(54) FACE SEAL CARRIER ARRESTER

(71) Applicant: Raytheon Technologies Corporation, Farmington, CT (US)

(72) Inventors: Andrew V. Schwendenmann, Hampden, MA (US); Armando Amador, Wethersfield, CT (US); Joseph B. Phelps, Vernon, CT (US); Sean McCutchan, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 20 days.

(21) Appl. No.: 17/003,083

(22) Filed: Aug. 26, 2020

(65) Prior Publication Data
US 2022/0065121 A1 Mar. 3, 2022

(51) Int. Cl.
*F16J 15/34* (2006.01)
*F01D 11/00* (2006.01)
*F01D 25/18* (2006.01)

(52) U.S. Cl.
CPC ......... *F16J 15/3468* (2013.01); *F01D 11/003* (2013.01); *F01D 25/183* (2013.01); *F16J 15/3452* (2013.01); *F16J 15/3492* (2013.01); *F05D 2240/55* (2013.01)

(58) Field of Classification Search
CPC .... F01D 25/183; F01D 25/186; F01D 11/003; F16J 15/34; F16J 15/344; F16J 15/3452; F16J 15/3468; F16J 15/3492
See application file for complete search history.

(56) References Cited

U.S. PATENT DOCUMENTS

| | | | | | |
|---|---|---|---|---|---|
| 2,984,505 | A | * | 5/1961 | Andresen | F16J 15/36 277/388 |
| 3,841,642 | A | * | 10/1974 | Kirker, Jr. | F16J 15/38 277/373 |
| 4,294,453 | A | * | 10/1981 | Inouye | F16J 15/3404 277/348 |
| 4,832,160 | A | * | 5/1989 | Fargier | F16D 66/024 188/1.11 L |
| 5,143,384 | A | * | 9/1992 | Lipschitz | F16J 15/3412 277/400 |

(Continued)

FOREIGN PATENT DOCUMENTS

| | | | | | |
|---|---|---|---|---|---|
| CN | 106594286 | A | * | 4/2017 | |
| CN | 111188653 | A | * | 5/2020 | ............... F16J 15/00 |

(Continued)

OTHER PUBLICATIONS

European Search Opinion in corresponding application 21193179.5, dated Jan. 24, 2022 (Year: 2022).*

(Continued)

*Primary Examiner* — Topaz L. Elliott
(74) *Attorney, Agent, or Firm* — Cantor Colburn LLP

(57) ABSTRACT

A face seal assembly includes a seal carrier, a seal element supported by the seal carrier, a rotating seal plate interactive with the seal element to define a face seal, and a seal arrester configured to engage the seal carrier at a predetermined amount of wear of the seal element to stop wear of the seal element.

18 Claims, 5 Drawing Sheets

(56) References Cited

U.S. PATENT DOCUMENTS

| | | | | |
|---|---|---|---|---|
| 5,246,235 | A * | 9/1993 | Heinzen | F16J 15/16 116/208 |
| 5,354,070 | A * | 10/1994 | Carmody | F16J 15/3436 277/370 |
| 6,425,583 | B1 * | 7/2002 | Muraki | F16J 15/3412 277/358 |
| 7,837,199 | B2 * | 11/2010 | Craig | F01D 11/003 277/377 |
| 10,385,713 | B2 * | 8/2019 | Walker | F16J 15/3472 |
| 10,788,131 | B2 * | 9/2020 | Miller | F16J 15/3248 |
| 11,085,330 | B2 * | 8/2021 | Pankratov | F01D 25/183 |
| 11,112,348 | B2 * | 9/2021 | Elder | F16J 15/3492 |
| 11,199,264 | B2 * | 12/2021 | Huang | F16J 15/3492 |
| 2010/0171269 | A1 * | 7/2010 | Prellwitz | F16J 15/3492 277/317 |
| 2013/0274023 | A1 * | 10/2013 | Francisco | F01D 5/02 464/179 |
| 2015/0337674 | A1 * | 11/2015 | Sonokawa | F16J 15/3472 415/173.3 |
| 2017/0268360 | A1 * | 9/2017 | De La Bruere Terreault | F01D 11/003 |
| 2019/0040957 | A1 * | 2/2019 | Miller | F16J 15/3452 |
| 2019/0040959 | A1 | 2/2019 | Sommers | |
| 2019/0063247 | A1 * | 2/2019 | Walker | F16J 15/453 |
| 2019/0162311 | A1 | 5/2019 | Lewis | |
| 2019/0178381 | A1 * | 6/2019 | Miller | F16J 15/3452 |
| 2019/0257214 | A1 * | 8/2019 | Pankratov | F01D 25/183 |
| 2021/0140547 | A1 * | 5/2021 | Sonokawa | F16J 15/3452 |
| 2021/0246986 | A1 * | 8/2021 | Huang | F16J 15/3492 |

FOREIGN PATENT DOCUMENTS

| | | | | |
|---|---|---|---|---|
| EP | 0185134 | A1 * | 6/1986 | F16J 15/3492 |
| EP | 3438417 | A1 * | 2/2019 | F01D 11/003 |
| WO | WO-2020006779 | A1 * | 1/2020 | F16J 15/00 |

OTHER PUBLICATIONS

European Search Report for European Application No. 21193179.5; dated Jan. 24, 2022; 8 pages.

* cited by examiner

FACE SEAL CARRIER ARRESTER

BACKGROUND

Exemplary embodiments of the present disclosure pertain to the art of gas turbine engines, and in particular to face seal assemblies of gas turbine engines.

Gas turbine engines include face seal assemblies at various locations, such as at bearing compartments and/or to seal to rotating shafts. Low time, premature, wear of seal elements of face seal assemblies is problematic for gas turbine engine reliability and operability. Premature seal element wear can result in seal element fracture and lack of oil containment, thereby resulting in conditions such as cabin odor or smoke in the cabin.

BRIEF DESCRIPTION

In one embodiment, a face seal assembly includes a seal carrier, a seal element supported by the seal carrier, a rotating seal plate interactive with the seal element to define a face seal, and a seal arrester configured to engage the seal carrier at a predetermined amount of wear of the seal element to stop wear of the seal element.

Additionally or alternatively, in this or other embodiments a spring element is configured to urge the seal carrier and the seal element toward the seal plate.

Additionally or alternatively, in this or other embodiments the seal arrester prevents urging of the seal carrier and the seal element toward the seal plate via the spring element.

Additionally or alternatively, in this or other embodiments the assembly includes a seal support, with the seal carrier and the seal element housed in the seal support.

Additionally or alternatively, in this or other embodiments the seal arrester is secured to the seal support.

Additionally or alternatively, in this or other embodiments the seal arrester is secured via one or more of a snap fit or installed in a groove of the seal support.

Additionally or alternatively, in this or other embodiments the seal arrester includes an arrester base and an arrester arm extending from the arrester base, the arrester arm configured to engage the seal carrier.

Additionally or alternatively, in this or other embodiments contact of the seal arrester to the seal carrier completes an electrical circuit to initiate an alarm.

Additionally or alternatively, in this or other embodiments the seal arrester is contoured to improve oil circulation at the seal arrester.

Additionally or alternatively, in this or other embodiments the seal element includes a nose portion configured to engage the seal plate.

In another embodiment, a gas turbine engine includes a turbine, a rotating shaft driven by the turbine, a bearing assembly supportive of the shaft, and a face seal assembly configured to seal the bearing assembly. The face seal assembly includes a seal carrier, a seal element supported by the seal carrier, a rotating seal plate interactive with the seal element to define a face seal, and a seal arrester configured to engage the seal carrier at a predetermined amount of wear of the seal element to stop wear of the seal element.

Additionally or alternatively, in this or other embodiments a spring element is configured to urge the seal carrier and the seal element toward the seal plate.

Additionally or alternatively, in this or other embodiments the seal arrester prevents urging of the seal carrier and the seal element toward the seal plate via the spring element.

Additionally or alternatively, in this or other embodiments the assembly includes a seal support, with the seal carrier and the seal element housed in the seal support.

Additionally or alternatively, in this or other embodiments the seal arrester is secured to the seal support.

Additionally or alternatively, in this or other embodiments the seal arrester is secured via one or more of a snap fit or installed in a groove of the seal support.

Additionally or alternatively, in this or other embodiments the seal arrester includes an arrester base and an arrester arm extending from the arrester base, the arrester arm configured to engage the seal carrier.

Additionally or alternatively, in this or other embodiments contact of the seal arrester to the seal carrier completes an electrical circuit to initiate an alarm.

Additionally or alternatively, in this or other embodiments the seal arrester is contoured to improve oil circulation at the seal arrester.

Additionally or alternatively, in this or other embodiments the seal element includes a nose portion configured to engage the seal plate.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
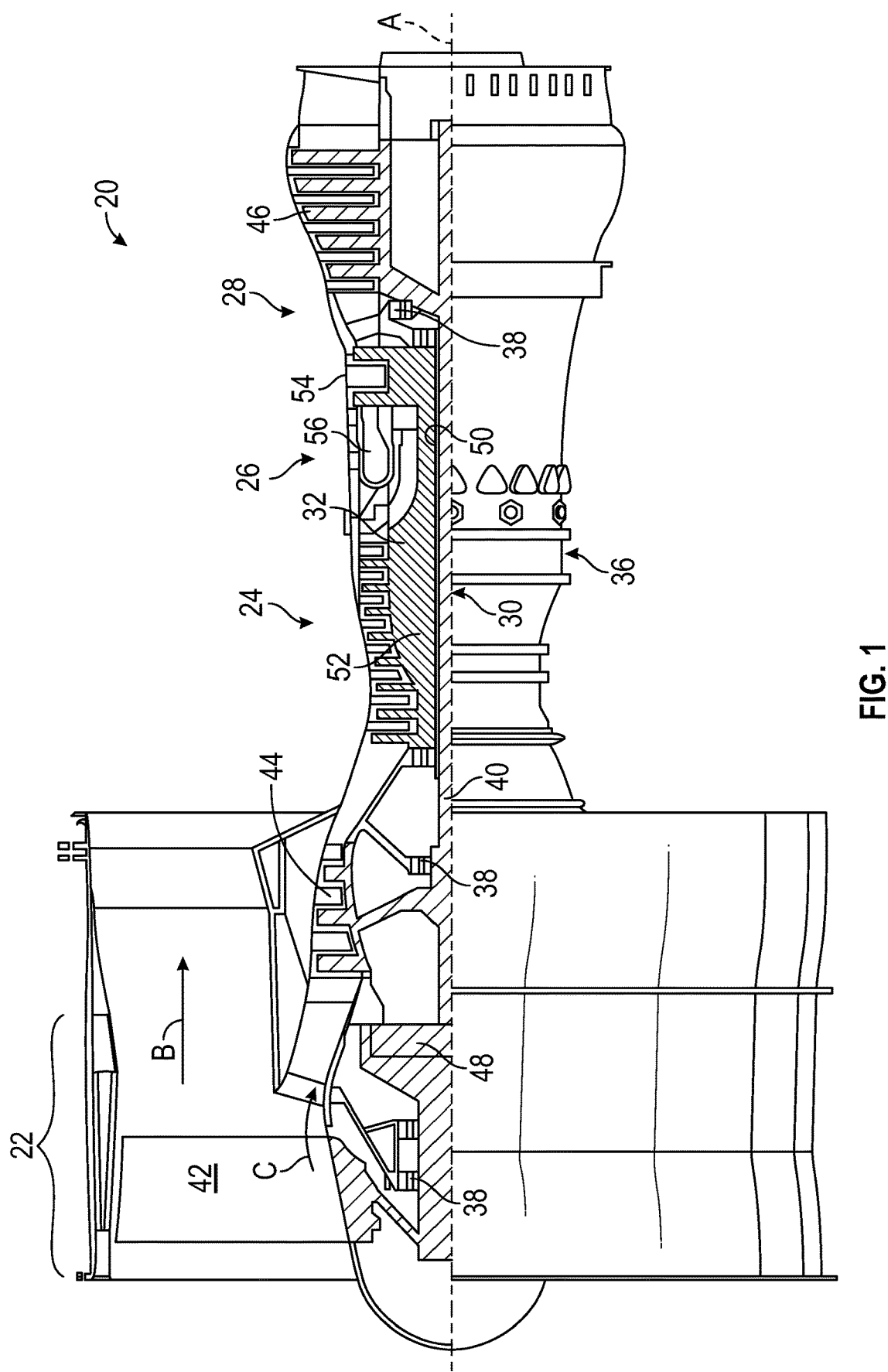
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
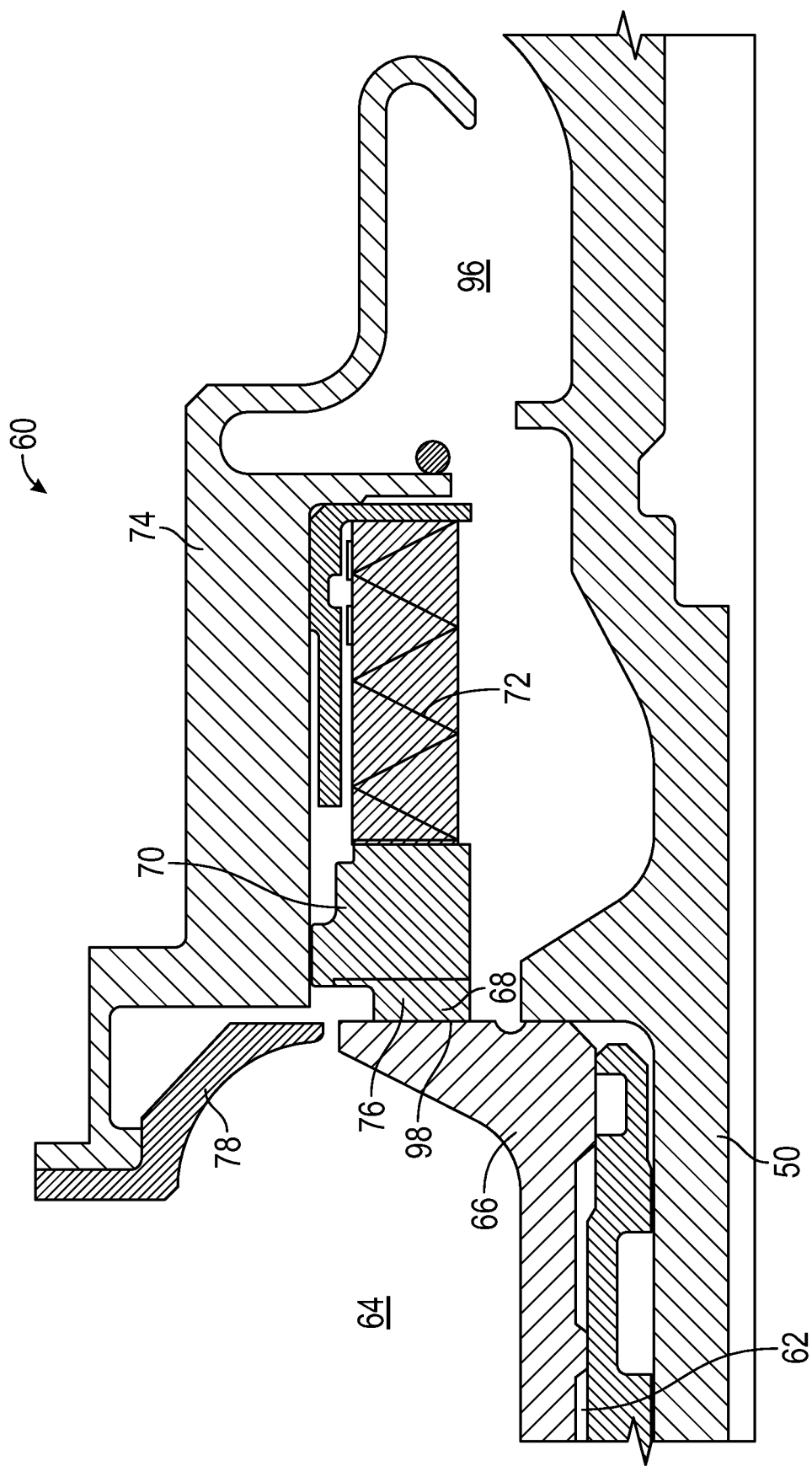
FIG. 2 is a cross-sectional view of an embodiment of a seal assembly.

Referring now to FIG. 2, illustrated is an embodiment of a face seal assembly 60 located at a bearing assembly 62. The bearing assembly 62 in this embodiment is located at the outer shaft 50, but one skilled in the art will appreciate that the bearing assembly 62 and face seal assembly 60 may be utilized at the inner shaft 40 or at other rotating components of the gas turbine engine 20. The face seal assembly 60 seals between a bearing compartment 64 and a buffer air cavity 96.

A seal plate 66 is secured to and rotates with the outer shaft 50. A seal element 68, formed from carbon, for example, is urged toward the seal plate 66 to define the face seal. The seal element 68 is supported by a seal carrier 70. In some embodiments, the seal element 68 and the seal carrier 70 are urged toward the seal plate 66 by a spring element 72. The seal carrier 70, the seal element 68 and the spring element 72 are housed in a stationary seal support 74. The seal element 68 includes a nose portion 76 that during operation contacts a sealing face 98 of the seal plate 66. As the seal plate 66 rotates about the engine central longitudinal axis A relative to the seal element 68, the nose portion 76 is eroded or worn away.

Figure 3:
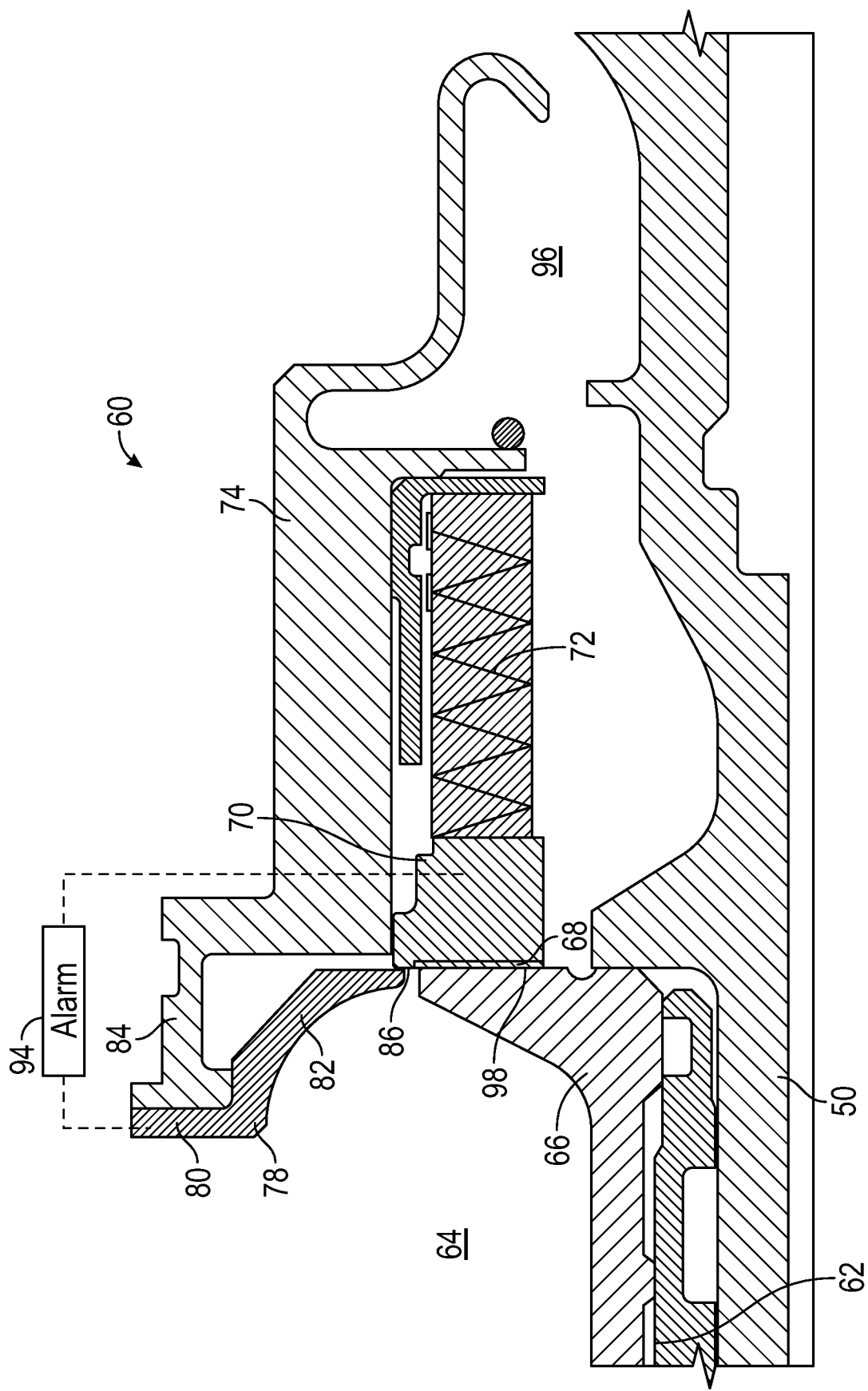
FIG. 3 is a cross-sectional view of another embodiment of a seal assembly.

Referring now to FIG. 3, to prevent over wear of the seal element 68 and damage to the seal element 68 and/or the seal carrier 70, an arrester 78 is secured to the seal support 74. When the nose portion 76 has completely worn away or as worn past a predetermined location, the seal carrier 70 contacts the arrester 78. This contact prevents further travel of the seal carrier 70 and the seal element 68, and thereby prevents further wear of the seal element 68. The face seal thus transitions from a contacting face seal to a close-clearance butt gap seal.

In the embodiment of FIG. 3, the arrester 78 includes an arrester base 80, with an arrester arm 82 extending from the arrester base 80 toward the seal element 68. The arrester base 80 is affixed to the seal support 74, and in particular to a support arm 84 of the seal support 74. In some embodiments a contact surface 86 of the arrester arm 82 is configured to contact the seal element 68 when the seal element 68 is worn. Further, the contact surface 86 is, in some embodiments, located at a same axial location as the contact surface 98 of the seal plate 66. In one embodiment, such as in FIG. 3, the arrester arm 82 is curvilinear along its length to aid in circulation of oil flow in the bearing compartment 64.

Figure 4:
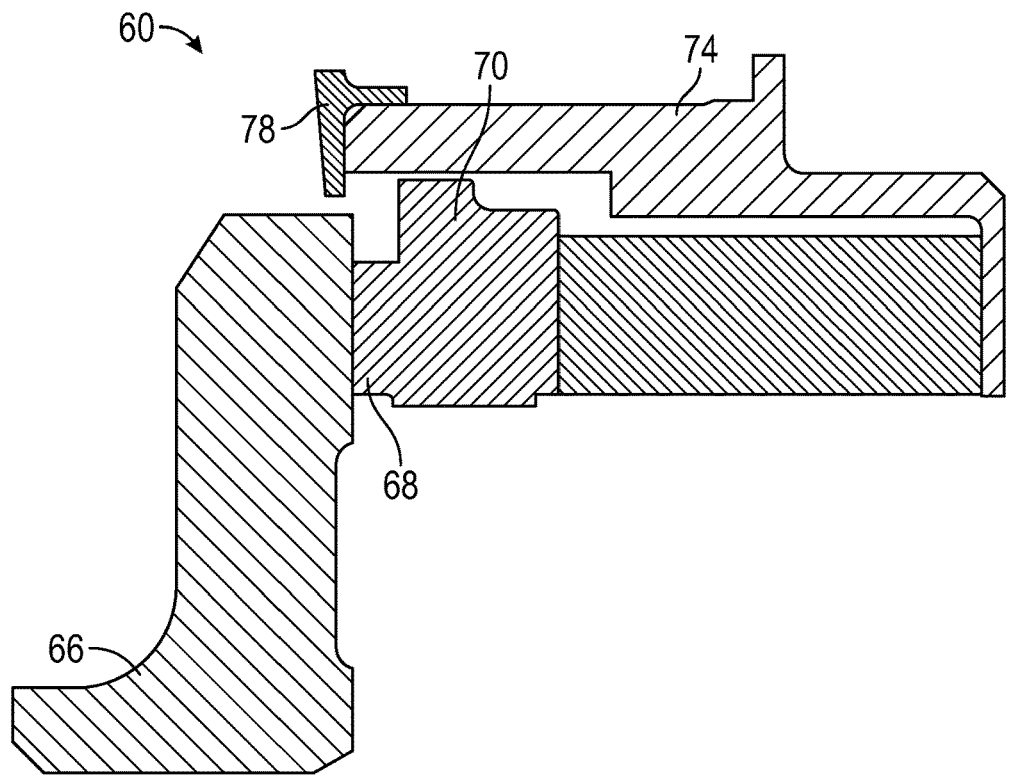
FIG. 4 is a cross-sectional view of yet another embodiment of a seal assembly.
Figure 5:
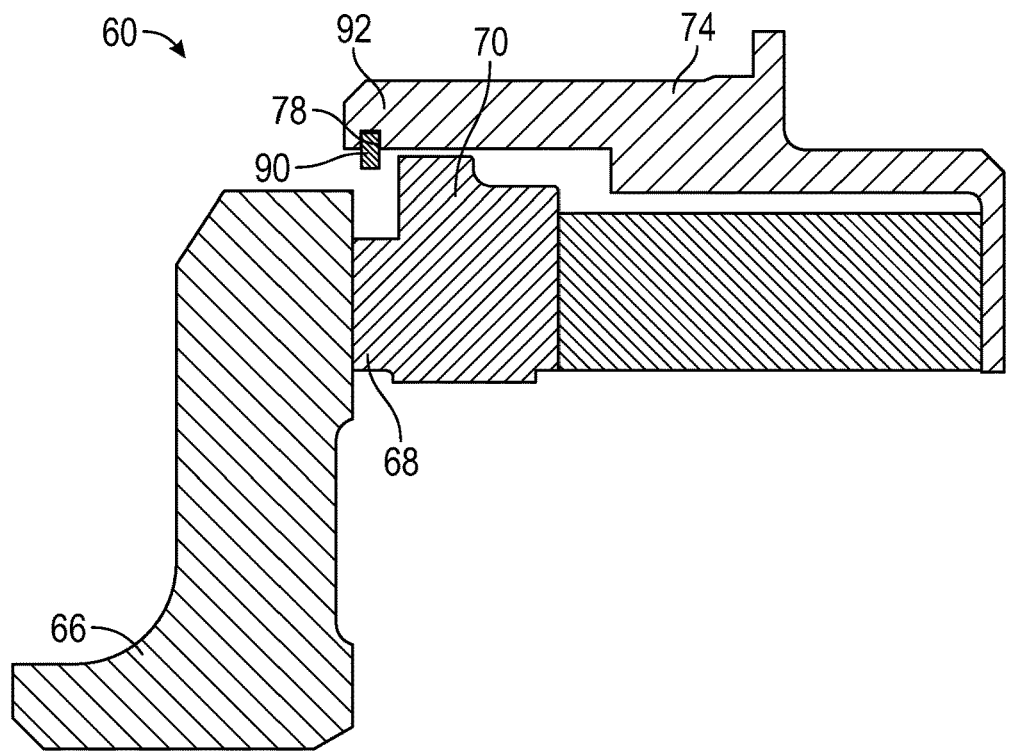
FIG. 5 is a cross-sectional view of still another embodiment of a seal assembly.
Figure 6:
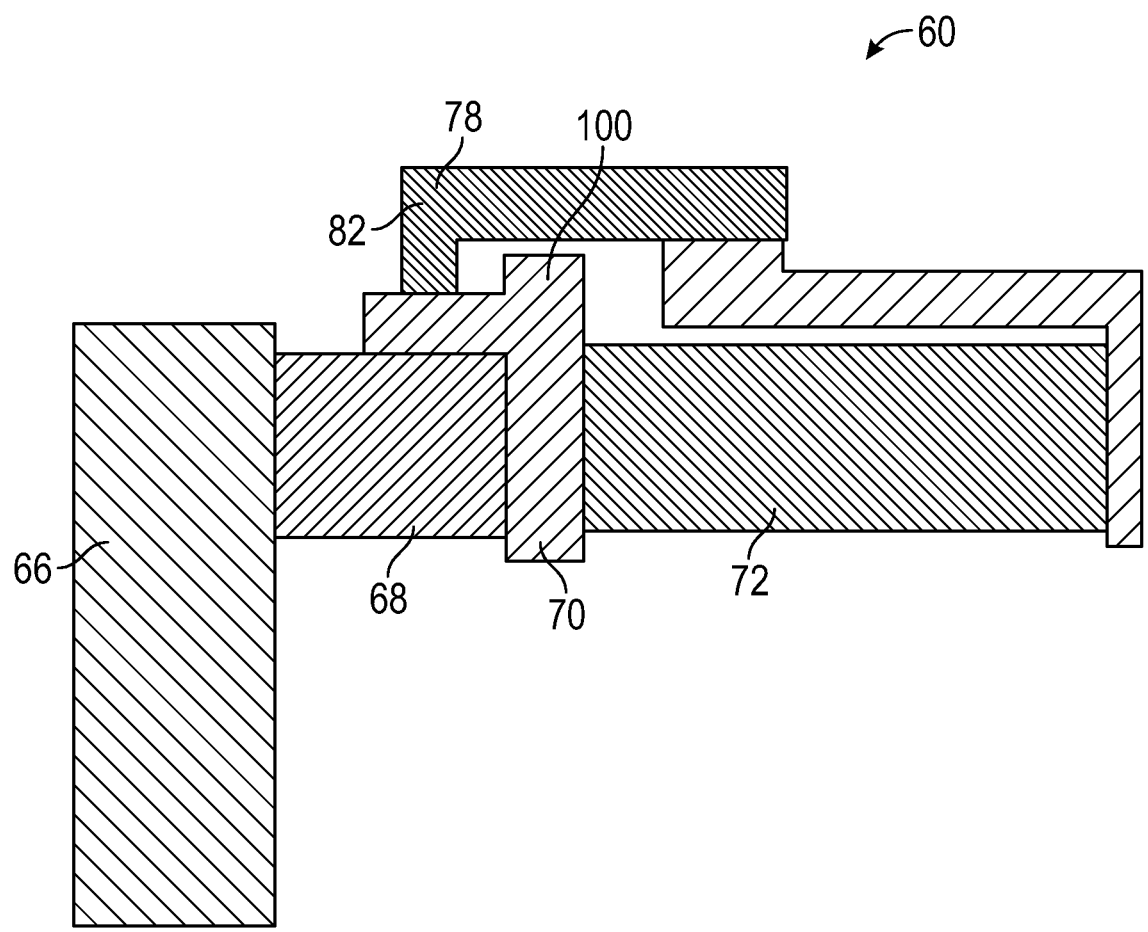
FIG. 6 is a cross-sectional view of another embodiment of a seal assembly.

In another embodiment, such as shown in FIG. 4, the arrestor 78 is snapped or press fit to the seal support 74. Alternatively, the arrestor 78 may be secured to the seal support 74 by, for example, a threaded connection. Referring now to FIG. 5, the arrestor 78 may be a retaining ring 90 disposed in a retaining groove 92 of the seal support 74, and which extends radially inwardly toward the seal element 68. In another embodiment, illustrated in FIG. 6, the seal carrier 70 includes a carrier flange 100 extending radially outwardly from the seal carrier 70, radially inboard of the arrestor 78. As the seal element 68 wears, the carrier flange 100 translates axially toward the arrestor arm 82, which then limits travel of the seal carrier 70 by acting as an axial stop. This configuration increases radial engagement of the arrestor 80 to the seal carrier 70 and allows the arrestor arm 82 to be positioned axially distant from the seal plate 66.

Referring again to FIG. 3, the arrester 78 may be configured to provide an alarm, for example in a cockpit or other location. In such embodiments, the seal carrier 70 is utilized to complete an electrical circuit, when contact between the seal carrier 70 and the arrester 78 is initiated. When the circuit is completed, an alarm indicator 94 such as a light or audible alarm is triggered.

Use of the arrester 78 stops seal element 68 wear at a selected level when the seal carrier 70 contacts the arrester 78, preventing more catastrophic failure of the seal assembly. Additionally, the arrester 78 may provide an active means for detection of seal element 68 wear, via the alarm indicator 94.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A face seal assembly, comprising:
a seal carrier;
a seal element supported by the seal carrier;
a rotating seal plate interactive with the seal element to define a face seal; and
a seal arrester configured to engage the seal carrier at a predetermined amount of wear of the seal element to stop wear of the seal element;
wherein contact of the seal arrester to the seal carrier completes an electrical circuit to initiate an alarm.

2. The face seal assembly of claim 1, further comprising a spring element configured to urge the seal carrier and the seal element toward the seal plate.

3. The face seal assembly of claim 2, wherein the seal arrester prevents urging of the seal carrier and the seal element toward the seal plate via the spring element.

4. The face seal assembly of claim 1, further comprising a seal support, with the seal carrier and the seal element housed in the seal support.

5. The face seal assembly of claim 4, wherein the seal arrester is secured to the seal support.

6. The face seal assembly of claim 5, wherein the seal arrester is secured via one or more of a snap fit or installed in a groove of the seal support.

7. The face seal assembly of claim 1, wherein the seal arrester includes an arrester base and an arrester arm extending from the arrester base, the arrester arm configured to engage the seal carrier.

8. The face seal assembly of claim 1, wherein the seal arrester is contoured to improve oil circulation at the seal arrester.

9. The face seal assembly of claim 1, wherein the seal element includes a nose portion configured to engage the seal plate.

10. A gas turbine engine, comprising:
a turbine;
a rotating shaft driven by the turbine;
a bearing assembly supportive of the shaft; and
a face seal assembly configured to seal the bearing assembly, including:
a seal carrier;
a seal element supported by the seal carrier;
a rotating seal plate interactive with the seal element to define a face seal; and
a seal arrester configured to engage the seal carrier at a predetermined amount of wear of the seal element to stop wear of the seal element;
wherein contact of the seal arrester to the seal carrier completes an electrical circuit to initiate an alarm.

11. The gas turbine engine of claim 10, further comprising a spring element configured to urge the seal carrier and the seal element toward the seal plate.

12. The gas turbine engine of claim 11, wherein the seal arrester prevents urging of the seal carrier and the seal element toward the seal plate via the spring element.

13. The gas turbine engine of claim 10, further comprising a seal support, with the seal carrier and the seal element housed in the seal support.

14. The gas turbine engine of claim 13, wherein the seal arrester is secured to the seal support.

15. The gas turbine engine of claim 14, wherein the seal arrester is secured via one or more of a snap fit or installed in a groove of the seal support.

16. The gas turbine engine of claim 10, wherein the seal arrester includes an arrester base and an arrester arm extending from the arrester base, the arrester arm configured to engage the seal carrier.

17. The gas turbine engine of claim 10, wherein the seal arrester is contoured to improve oil circulation at the seal arrester.

18. The gas turbine engine of claim 10, wherein the seal element includes a nose portion configured to engage the seal plate.

* * * * *